United States Patent
Granot et al.

(10) Patent No.: US 8,229,254 B2
(45) Date of Patent: Jul. 24, 2012

(54) SYSTEMS AND METHODS FOR POLARIZATION MODE DISPERSION MITIGATION

(75) Inventors: Er'el Granot, Herzliya (IL); Shalva Ben-Ezra, Rehovot (IL); Gil Blecher, Petach Tikva (IL); Shai Tzadok, Petach Tikva (IL); Reuven Zaibel, Gan Yavne (IL); Roni Dadon, Ashdod (IL); Motti Caspi, Rishon Lezion (IL); Haim Chayet, Nes-Ziona (IL); Yehuda Ganz, D.N. Karkur (IL); Arieh Sher, Rehovot (IL)

(73) Assignee: Kailight Photonics, Inc., Horsham, PA (US)

(*) Notice: Subject to any disclaimer, the term of this patent is extended or adjusted under 35 U.S.C. 154(b) by 81 days.

(21) Appl. No.: 12/271,780

(22) Filed: Nov. 14, 2008

(65) Prior Publication Data
US 2009/0073561 A1 Mar. 19, 2009

Related U.S. Application Data

(62) Division of application No. 11/585,651, filed on Oct. 24, 2006, now Pat. No. 7,454,092.

(51) Int. Cl.
G02B 6/00 (2006.01)
(52) U.S. Cl. ............... 385/11; 398/158; 359/483.01
(58) Field of Classification Search ............ 385/11; 359/495, 192.01–493.01, 483.01; 398/158
See application file for complete search history.

(56) References Cited

U.S. PATENT DOCUMENTS

| 4,296,995 A | 10/1981 | Bickel |
| 5,894,532 A | 4/1999 | Moores |
| 5,974,205 A | 10/1999 | Chang |
| 6,266,457 B1 | 7/2001 | Jacob |
| 6,459,830 B1 * | 10/2002 | Pua et al. ............... 385/24 |
| 6,665,497 B1 | 12/2003 | Hamilton-Gahart et al. |
| 6,842,283 B2 | 1/2005 | Savory et al. |
| 7,130,030 B2 | 10/2006 | Davidson et al. |

(Continued)

FOREIGN PATENT DOCUMENTS

CN 1455528A A 11/2003
(Continued)

OTHER PUBLICATIONS

European Search Report issued for European Patent Application No. 07254201.2, dated Feb. 20, 2008, 6 pages.
(Continued)

*Primary Examiner* — Ellen Kim
(74) *Attorney, Agent, or Firm* — Fulbright & Jaworski L.L.P.

(57) ABSTRACT

In one exemplary embodiment, a method comprises transmitting an optical signal via the optical line, measuring a relative change in spectral intensity of the optical signal near a clock frequency (or half of that frequency) while varying a polarization of the optical signal between a first state of polarization and a second state of polarization, and using the relative change in spectral intensity of the optical signal to determine and correct the DGD of the optical line. Another method comprises splitting an optical signal traveling through the optical line into a first and second portions having a first and second principal states of polarization of the optical line, converting the first and second portions into a first and second electrical signals, delaying the second electrical signal to create a delayed electrical signal that compensates for a DGD of the optical line, and combining the delayed electrical signal with the first electrical signal to produce a fixed output electrical signal.

11 Claims, 6 Drawing Sheets

U.S. PATENT DOCUMENTS

| | | | |
|---|---|---|---|
| 7,302,192 | B2 | 11/2007 | Elahmadi et al. |
| 7,403,717 | B2 * | 7/2008 | von der Weid et al. ........ 398/152 |
| 2001/0028760 | A1 | 10/2001 | Yaffe |
| 2002/0018266 | A1 * | 2/2002 | Ooi et al. ...................... 359/161 |
| 2003/0011854 | A1 | 1/2003 | Kahn et al. |
| 2003/0175034 | A1 | 9/2003 | Noe |
| 2003/0201385 | A1 | 10/2003 | Schulz et al. |
| 2004/0022376 | A1 | 2/2004 | Davidson et al. |
| 2004/0131363 | A1 * | 7/2004 | Kisaka et al. ................. 398/152 |
| 2004/0202396 | A1 | 10/2004 | Chung et al. |
| 2004/0207902 | A1 * | 10/2004 | Koch et al. .................... 359/301 |
| 2004/0213500 | A1 * | 10/2004 | Zeng et al. ...................... 385/11 |
| 2004/0245436 | A1 | 12/2004 | Matsumoto |
| 2005/0002675 | A1 | 1/2005 | Sardesai et al. |
| 2005/0088738 | A1 | 4/2005 | Islam et al. |
| 2005/0094130 | A1 * | 5/2005 | Han et al. .................... 356/73.1 |
| 2006/0126999 | A1 | 6/2006 | Feldman et al. |
| 2006/0204162 | A1 | 9/2006 | Stook et al. |
| 2008/0095538 | A1 | 4/2008 | Granot et al. |
| 2008/0205814 | A1 * | 8/2008 | Qiao et al. ...................... 385/11 |
| 2008/0205886 | A1 * | 8/2008 | Anderson et al. ............... 398/26 |
| 2009/0073560 | A1 * | 3/2009 | Granot et al. ................. 359/495 |
| 2009/0080883 | A1 * | 3/2009 | Granot et al. ................... 398/34 |

FOREIGN PATENT DOCUMENTS

| | | |
|---|---|---|
| EP | 1411656 | 4/2004 |
| WO | WO-03/040777 | 5/2003 |
| WO | WO-03/058857 | 7/2003 |

OTHER PUBLICATIONS

Office Communication dated Feb. 11, 2008 and European Search Report dated Feb. 5, 2008 for European Application: EP 07 25 4202, 7 pages.

Sumriddetchkajorn, S., "N-Bit Fully-Covered Variable Photonic Time Delay Architectures for Polarization Mode Dispersion Compensation," Proc. SPIE, vol. 5625, No. 975, online publication date: Feb. 28, 2005, pp. 975-983.

Yan et al., "Programmable Differential-Group-Delay (DGD) Elements Based Polarization-Mode-Dispersion (PMD) Emulator with Tunable Statistics," IEEE LEOS Newsletter, Dec. 2005, pp. 4-9.

Office Action for U.S. Appl. No. 11/585,659, dated Nov. 30, 2009, 14 pages.

Office Action for U.S. Appl. No. 12/271,771, dated Dec. 9, 2009, 7 pages.

Chinese Office Action issued for Application No. 200710165627.2 dated Sep. 15, 2011, with English language translation, 10 pages.

D. Sandel, et al., "Automatic polarization mode dispersion compensation in 40 Gbit/soptical transmission system", Electronics Letters, vol. 34, No. 23, Nov. 12, 1998, pp. 7-8.

* cited by examiner

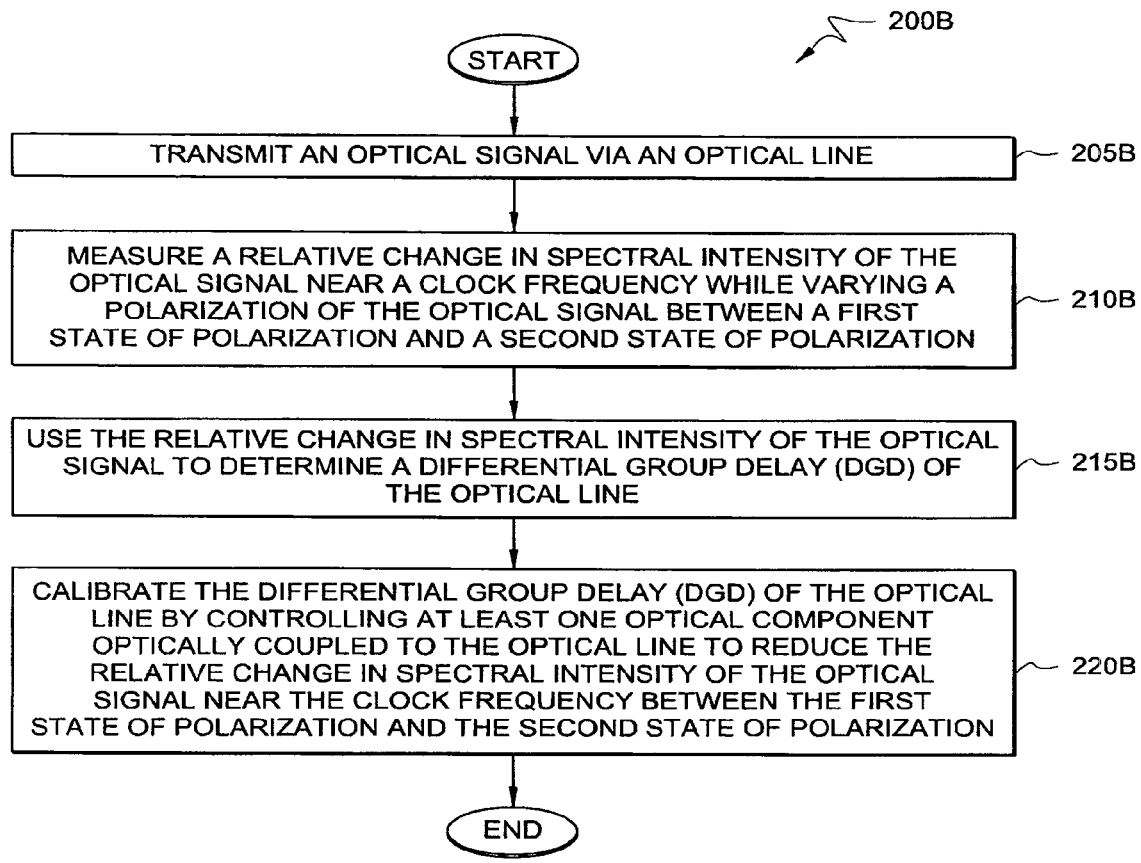
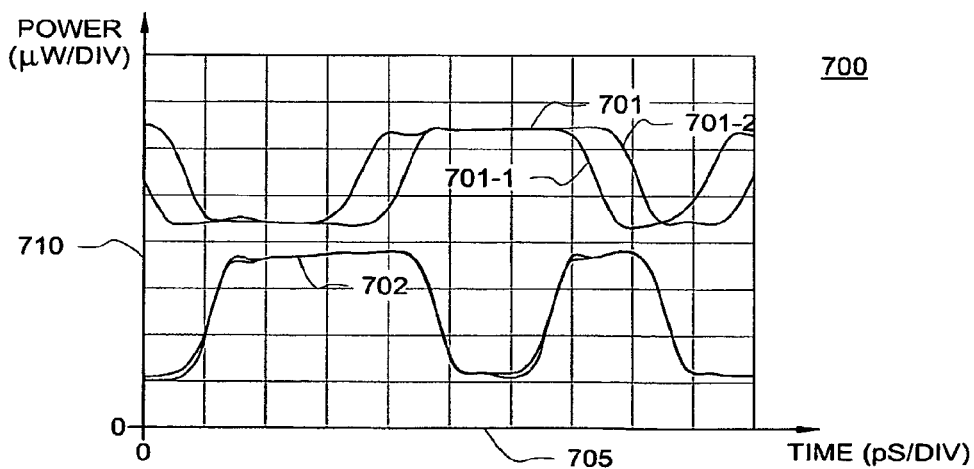

SYSTEMS AND METHODS FOR POLARIZATION MODE DISPERSION MITIGATION

CROSS-REFERENCE TO RELATED APPLICATIONS

The present application is a division of U.S. patent application Ser. No. 11/585,651 entitled "SYSTEMS AND METHODS FOR POLARIZATION MODE DISPERSION MITIGATION," filed Oct. 24, 2006, which is related to concurrently filed and commonly assigned U.S. patent application Ser. No. 11/585,659 entitled "OPTICAL TRANSPONDERS WITH REDUCED SENSITIVITY TO POLARIZATION MODE DISPERSION (PMD) AND CHROMATIC DISPERSION (CD)," filed Oct. 24, 2006, the disclosures of which are hereby incorporated by reference herein.

TECHNICAL FIELD

The present invention relates generally to optical systems, and, more particularly, to systems and methods for polarization mode dispersion ("PMD") mitigation.

BACKGROUND OF THE INVENTION

In modern optical networks, signals are often transmitted over hundreds, or even thousands of kilometers. Optical signals traveling over long-haul and ultra long-haul optical fibers may encounter many different obstacles, including attenuation, chromatic dispersion, and PMD. While attenuation problems have been successfully addressed by the use of amplifiers and chromatic dispersion by the use of dispersion compensating fibers, PMD has been much more difficult to handle.

PMD is a phenomenon that occurs when signals with different polarizations inside a fiber travel at slightly different speeds, for example, due to random imperfections and asymmetries of the optical fiber. This effect causes signal deformation. As a consequence, PMD can make it very difficult to reliably transmit data at high bit rates. Most networks were built with poor quality fibers in their underground installations at a time when low bit rates were used and PMD was not yet recognized as a potential issue. However, now that these structures must support bit rates of 40 Gb/s and higher, PMD presents a significant obstacle to network upgrading.

Generally, the PMD of an optical system cannot be accurately modeled by a single parameter (e.g., its length), but instead it must be characterized by a series of parameters that represent the entire "history" along the communication line. In practice, however, a few PMD measurement and correction systems have been developed. For example, U.S. Pat. No. 5,930,414 to Fishman, et al. and U.S. Pat. No. 6,865,305 to Rasmussen, et al. describe an electronic apparatus that measures eye-pattern parameters of a signal—e.g., signal-to-noise-ratio, error rate, crossing, etc., and thus indirectly determines the PMD of the optical line. Fishman, et al. further disclose correcting PMD by splitting the beam signal into two principal states of polarization ("PSPs"), subjecting one of the two PSPs to a relative delay using a delay line, and then recombining the two PSPS. Meanwhile, Rasmussen, et al. teach correcting PMD by using polarization maintaining fibers ("PMFs").

BRIEF SUMMARY OF THE INVENTION

The present invention relates to systems and methods for polarization mode dispersion (PMD) mitigators that may be used, for example, to facilitate the transmission of data across optical networks. It is an objective of the present invention to provide methods and apparatuses for measuring and correcting PMD in an optical network. It is another objective of the present invention to provide methods and apparatuses for reducing first-order PMD (differential group delay or "DGD") of signals traveling through optical lines, including long-haul optical fibers. Exemplary embodiments of the present invention comprise a PMD mitigator having a PMD measuring module coupled to a control module and/or a PMD mitigation device. One of the advantages of the present invention is that it provides high performance, low cost, and compact PMD correction devices. Moreover, certain embodiments of the present invention may be integrated into an optical transponder and utilize the transponder's electronic infrastructure, thus reducing design and manufacturing costs.

In one exemplary embodiment, a method for measuring the DGD of an optical line comprises transmitting an optical signal having a modulation frequency via the optical line using a polarization scrambler having a scrambling frequency, measuring a spectral intensity of a sideband of the optical signal at the clock frequency of the optical signal (or half of that clock frequency), and using the spectral intensity of the sideband to determine the DGD of the optical line. Another method for measuring the DGD of an optical line comprises transmitting an optical signal via the optical line, measuring a relative change in spectral intensity of the optical signal at the clock frequency while varying a polarization of the optical signal between a first state of polarization and a second state of polarization, and using the relative change in spectral intensity of the optical signal to determine the DGD of the optical line.

In another exemplary embodiment, a polarization mode dispersion (PMD) mitigation apparatus comprises an optical detector optically coupled to an optical line, where the optical detector is operable to receive a portion of an optical output signal and convert it into an electrical signal, a radio-frequency (RF) bandpass filter electrically coupled to the optical detector, where the RF bandpass filter is tuned to a clock frequency and is operable to filter the electrical signal, and an RF detector electrically coupled to the RF bandpass filter, where the RF detector is operable to measure an intensity of the filtered electrical signal. Another polarization mode dispersion (PMD) mitigation apparatus comprises an optical detector optically coupled to an optical line, where the optical detector is operable to receive a portion of an optical output signal and convert it into an electrical signal, a clock recovery unit electrically coupled to the optical detector, where the clock recovery unit is operable to extract a clock signal from the electrical signal, a combiner electrically coupled to the clock recovery unit and to the optical detector, where the combiner is operable to mix the clock signal with the electrical signal, a lowpass filter electrically coupled to the combiner, where the lowpass filter is operable to receive an output signal from the combiner and produce a filtered electrical signal, and a radio-frequency (RF) detector electrically coupled to the lowpass filter, where the RF detector is operable to measure an intensity of the filtered electrical signal.

In yet another exemplary embodiment, a polarization mode dispersion (PMD) mitigation device comprises a plurality of optical elements in a cascaded configuration and operable to correct PMD of an optical line by operating on each of two polarization modes of an optical signal traveling through the optical line, where the optical elements comprise at least one birefringent crystal. Another PMD mitigation device comprises a first collimator optically coupled to an optical line, a polarization controller optically coupled to the first collimator, a first birefringent crystal optically coupled to the polarization controller, a first tunable half-wavelength (λ/2) plate optically coupled to the first birefringent crystal, a second birefringent crystal optically coupled to the first tunable plate, a second tunable half-wavelength (λ/2) plate optically coupled to the second birefringent crystal, a third birefringent crystal optically coupled to the second tunable plate, and a second collimator optically coupled to the optical line.

In still another exemplary embodiment, a method for correcting a polarization mode dispersion (PMD) of an optical line comprises splitting an optical signal traveling through the optical line into a first portion having a first principal state of polarization and a second portion having a second principal state of polarization, converting the first and second portions into a first and second electrical signals, delaying the second electrical signal to create a delayed electrical signal that compensates for a differential group delay (DGD) of the optical line, and mixing the delayed electrical signal with the first electrical signal to produce a fixed output electrical signal. Another polarization mode dispersion (PMD) apparatus comprises a polarization controller operable to orient an optical signal traveling through an optical line into two principal states of polarization, a polarization beam splitter optically coupled to the polarization controller and operable to split the optical signal into a first portion having a first principal state of polarization and a second portion having a second principal state of polarization, a first optical detector optically coupled to the polarization beam splitter and operable to convert the first portion into a first electrical signal, a second optical detector optically coupled to the polarization beam splitter and operable to convert the second portion in to a second electrical signal, a tunable electronic delay device electrically coupled to the second optical detector and operable to compensate for a differential group delay (DGD) of the optical line, and a combiner electrically coupled to the first optical detector and the tunable electronic delay device, where the combiner is operable to produce a fixed output electrical signal.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by any person with ordinary skill in the art that the conception and specific embodiment disclosed may be readily utilized as a basis for modifying or designing other structures for carrying out the same purposes of the present invention. It should also be realized by any person with ordinary skill in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following description taken in conjunction with the accompanying drawings, in which:

FIG. 2B is a flowchart of another PMD measurement and mitigation method, according to another exemplary embodiment of the present invention;

FIG. 7 is a graph of simulated results obtained with a single-stage PMD mitigation system, according to one exemplary embodiment of the present invention;

DETAILED DESCRIPTION OF THE INVENTION

In the following description, reference is made to the accompanying drawings that form a part hereof, and in which is shown by way of illustration specific embodiments in which the invention may be practiced. These embodiments are described in sufficient detail to enable a person of ordinary skill in the art to practice the invention, and it is to be understood that other embodiments may be utilized and that structural, logical, optical, and electrical changes may be made without departing from the scope of the present invention. The following description is, therefore, not to be taken in a limited sense, and the scope of the present invention is defined by the appended claims.

Polarization mode dispersion ("PMD") is a polarization-dependent propagation delay that may be measured in the first order as a differential group delay ("DGD") between the fastest and slowest propagating polarization modes within an optical line. Some exemplary embodiments of the present invention provide active methods for measuring and correcting PMD. As such, the PMD of an optical line may be measured and used to create a feedback signal in the correction process. In at least one embodiment, the amount of PMD need not be determined in order for the PMD of the line to be corrected.

Figure 1:
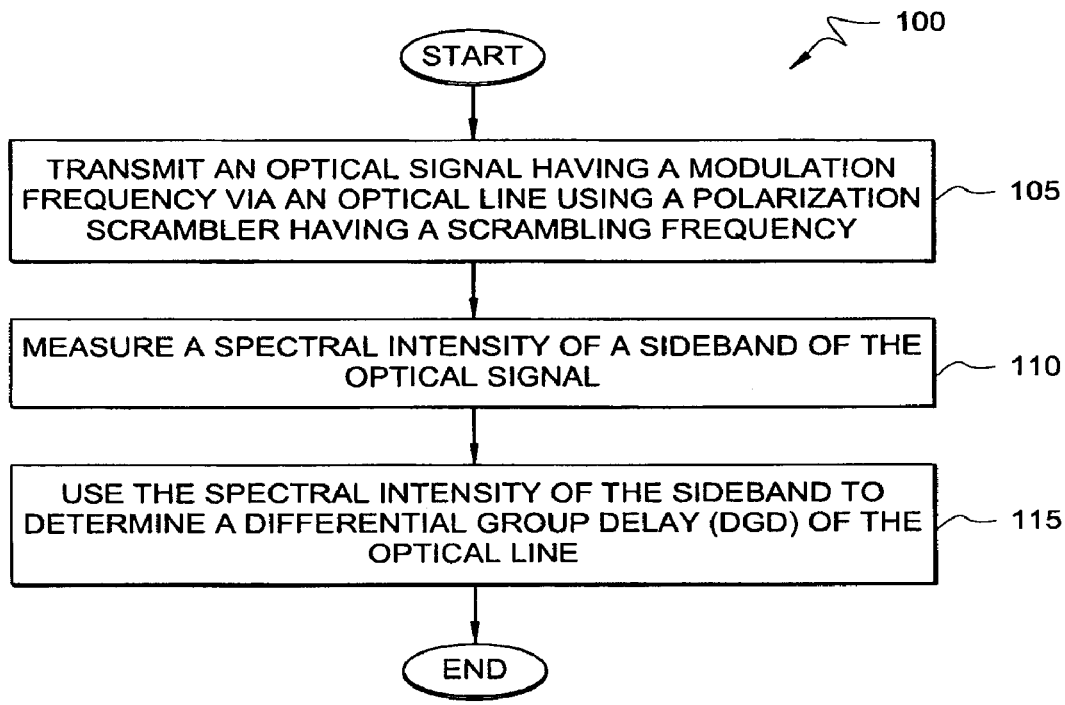
FIG. 1 is a flowchart of a PMD measurement method, according to one exemplary embodiment of the present invention.

Turning now to FIG. 1, PMD measurement method 100 is depicted according to one exemplary embodiment of the present invention. In step 105, a signal modulated at a relatively large frequency (e.g., 5 GHz) is generated and then transmitted through an optical communication line using a polarization scrambler having a known scrambling frequency (e.g., 1 MHz). When there is no DGD in the line, the spectrum of the detected or output signal comprises a single peak at the modulation frequency. However, when DGD is present, two additional sidebands appear at the two sides of the modulation frequency (i.e., at 5 GHz−1 MHz and 5 GHz+1 MHz). Accordingly, the magnitude of the DGD is manifested in the size of the sidebands.

Still referring to method 100, the spectral intensity of a sideband of the optical signal is measured in step 10. In step 115, the spectral intensity of the sideband may be used to determine a DGD of the optical line. For instance, if $\Omega$ is the modulation frequency (e.g., 5 GHz) and $\omega$ is the scrambling frequency (e.g., 1 MHz), the intensity measured by the detector is equal to:

$$I(t)=I_0\{\sin^2(\omega t/2)\cos[\Omega(t+\Delta t)]+\cos^2(\omega t/2)\cos[\Omega(t-\Delta t)]\},$$

where $\Delta t$ is the DGD of the line.

Moreover, the spectral intensity of the two sidebands is proportional to:

$$I(\Omega \pm \omega) = I_0 \sin^2(\Omega \Delta t)/4.$$

Therefore, for small DGD, the intensity of the sidebands is proportional to the square of $\Delta t$, or, more specifically, $$I(\Omega \pm \omega) \approx I_0 (\pi \Delta t/T)^2,$$

where T is the period (e.g., 200 ps in the case of a 5 GHz modulation frequency).

According to method 100, a spectral component may be measured near the clock frequency to avoid having to dedicate a wavelength-division multiplexing (WDM) channel for measurement purposes. The spectrum of an ideal PRBS NRZ signal has a shape defined by: $\sin(\pi f/f_c)/(\pi f/f_c)$. Theoretically, for an ideal pseudo-random binary sequence (PRBS) non-return-to-zero (NRZ) signal, the spectral component at the clock frequency $f_c (\Omega = 2\pi f_c)$ vanishes. However, for any real signal where the length period of the ones is different than the length period of the zeros, a spectral component may be found at $f_c$ and it may be expressed as:

$$I(t)=I_1(t)+\alpha \cos(2\pi f_c t+\phi),$$

where $I_1(t)$ is the remainder of the signal (with the spectral envelope $\sin(\pi f/f_c)/(\pi f/f_c)$, and without a spectral component at $f_c$), and where $\alpha$ and $\phi$ are the amplitude and phase at the carrier's frequency. Therefore, method 100 may advantageously be used at or near the clock frequency where the spectral energy for a PRBS signal is relatively low.

As previously noted, method 100 requires having a dedicated wavelength with given modulation frequency, which means that this dedicated wavelength cannot be used to carry information. To avoid using a dedicated wavelength, a parasitic peak that appears at $f_c$ (or $f_c/2$) may be used even if the wavelength carries information. Typically, there is less ambient noise the $f_c$ region, thus resulting in more accurate measurements. Moreover, for small DGD values, the clock frequency is preferred, since the intensity of the signal is proportional to the square of $\sin(\Omega \Delta t)$. In other cases, however, it may be useful to also measure the $f_c/2$ component. For example, in networks operating at 40 GB/s, the $f_c/2$ component vanishes for DGD values around 25 ps. Thus, it may be useful also to measure the half frequency $f_c/2$, since in this case $\sin(\Omega \Delta t)$ vanishes only when the DGD is 50 ps.

Figure 2A:
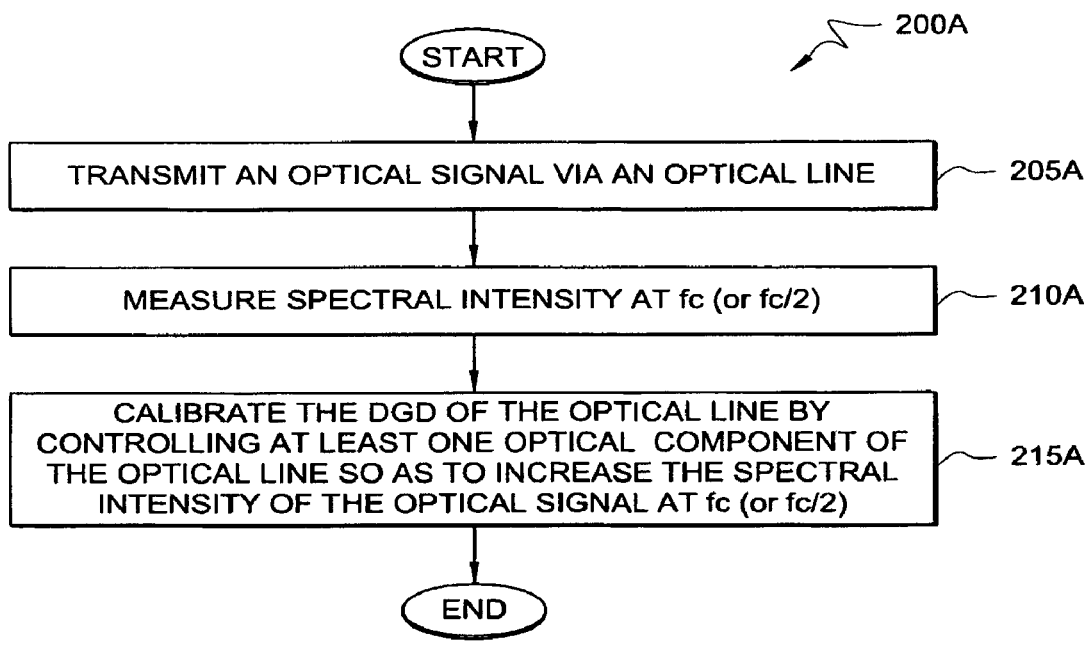
FIG. 2A is a flowchart of a PMD measurement and mitigation method, according to one exemplary embodiment of the present invention.

Turning now to FIG. 2A, PMD measurement and mitigation method 200A is depicted according to one exemplary embodiment of the present invention. In step 205A, an optical signal is transmitted via an optical line. In step 210A, the spectral intensity of the optical signal at or near a clock frequency (or half the clock frequency) is measured. Then, in step 215A, the DGD of the optical line is reduced by controlling at least one optical component of the optical line so as to increase or maximize the spectral intensity of the optical signal near the clock frequency (or $f_c/2$). It should be noted that a step for measuring the DGD of the line is not required according to this exemplary embodiment.

Referring to FIG. 2B, another PMD measurement and mitigation method 200A is depicted according to another exemplary embodiment of the present invention. In this alternative embodiment, an optical signal is transmitted via an optical line in step 205B. Then, a relative change in the spectral intensity of the optical signal is measured while the polarization of the optical signal is varied between first and second states of polarization in step 210B. The relative change in spectral intensity of the optical signal may be used in step 215B to determine a DGD of the optical line. In step 220B, optical line's DGD is reduced by controlling an optical component of the optical line so as to reduce the relative change in spectral intensity of the optical signal near the clock frequency when the polarization of the optical signal is varied between first and second states.

Still referring to method 200, when a signal passes through a medium with a first order PMD (i.e., a given DGD $\Delta t$), it is split into two relatively delayed signals represented by:

$$I_{out}(t) = (1+b)I\left(t - \frac{\Delta t}{2}\right) + (1-b)I\left(t + \frac{\Delta t}{2}\right),$$

where b is a coefficient. The spectrum of this signal may be described as:

$$I_{out}(\omega)=I(\omega)[(1+b)\exp(-i\omega\Delta t/2)+(1-b)\exp(i\omega\Delta t/2)]= 2I(\omega)[\cos(\omega\Delta t/2)-bi\sin(\omega\Delta t/2)]$$

Accordingly, the spectral intensity is:

$$|I_{out}(\omega)|=2I(\omega)\sqrt{\cos^2(\omega\Delta t/2)+\sin^2(\omega\Delta t/2)}.$$

And, at the vicinity of the clock frequency, for example:

$$|I_{out}(\omega)|=\alpha\delta(\omega-2\pi f_c)\sqrt{\cos^2(\omega\Delta t/2)+\sin^2(\omega\Delta t/2)}.$$

where $\alpha$ is a constant and $\delta(x)$ is the Dirac delta function. Therefore, when polarization is oriented at one of the principal states of polarizations (i.e., b=±1) the spectrum at the clock frequency has a maximum:

$$|I_{out}(\omega)|=\alpha\delta(\omega-2\pi f_c).$$

Meanwhile, when b≠±1 this component gets its maximum value for $\Delta t$=0 (i.e., for zero DGD). A maximum value of the spectral component (at $f_c$ or $f_c/2$) corresponds to a high quality signal—i.e., without deformation caused by DGD.

The relative change in the clock frequency may be expressed as:

$$\eta \equiv \frac{I(2\pi f_c, 0) - I(2\pi f_c, \Delta t)}{I(2\pi f_c, 0)} = (1-b^2)\sin^2\left(\pi\frac{\Delta t}{T}\right),$$

where $T \equiv f_c^{-1}$ is the bit's period. Therefore, by monitoring $\eta$, the DGD $\Delta t$ may be evaluated. Accordingly, a criterion for system calibration may be that $\eta$ vanish or be reduced or, in other words, that $I_{out}(2\pi f_c)$ be maximized. While this technique is very sensitive to measuring relatively small $\Delta t$ values, it not useful when $\Delta t$=T. Thus, certain embodiments of the present invention measure the two spectral components $f_c$ and $f_c/2$. Moreover, as a person of ordinary skill in the art will readily recognize in light of this disclosure, one of the advantages of this method is that there is no need to know the absolute value of α, because only relative values are relevant.

Figure 3:
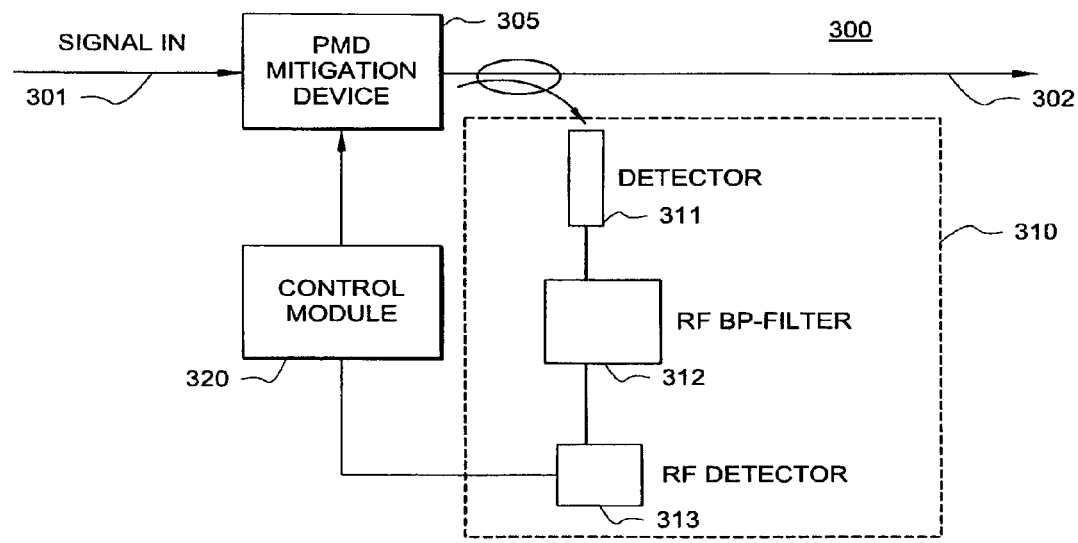
FIG. 3 is a block diagram of a PMD mitigator having a filter-based measurement module, according to one exemplary embodiment of the present invention.

Referring now to FIG. 3, PMD mitigator 300 having filter-based measurement module 310 is depicted according to one exemplary embodiment of the present invention. PMD mitigator 300 may be used, for example, to implement one of the PMD measurement and/or calibration methods described above. In operation, optical input signal 301 passes through PMD mitigation device 305, which produces optical output signal 302. Optical detector 311 of PMD measurement module 310 is optically coupled to the optical output line of PMD mitigation device 305, and it may receive a portion of optical output signal 302 thus converting it into an electrical signal. In an alternative embodiment, the electrical output of an optical detector already existing within the transponder is coupled to PMD module 310, thus eliminating the need for an additional detector. Radio-frequency (RF) bandpass filter 312 is electrically coupled to optical detector 311 and is operable to filter the electrical signal received from optical detector 311. In one exemplary embodiment, RF bandpass filter 312 is tuned to the clock frequency of the optical system.

RF detector 313 is electrically coupled to RF bandpass filter 312 and it is operable to measure an intensity of the filtered electrical signal received from RF bandpass filter 312. Control module 320 is electrically coupled to RF detector 313 of PMD measurement module 310, and PMD mitigation device 305 is electrically coupled to control module 320. Accordingly, control module 320 may process an intensity measurement received from RF detector 313, and may control at least one optical component of PMD mitigation device 305 using methods 100 and/or 200 of FIGS. 1 and 2, for example, to correct or reduce PMD in the optical line.

Figure 4:
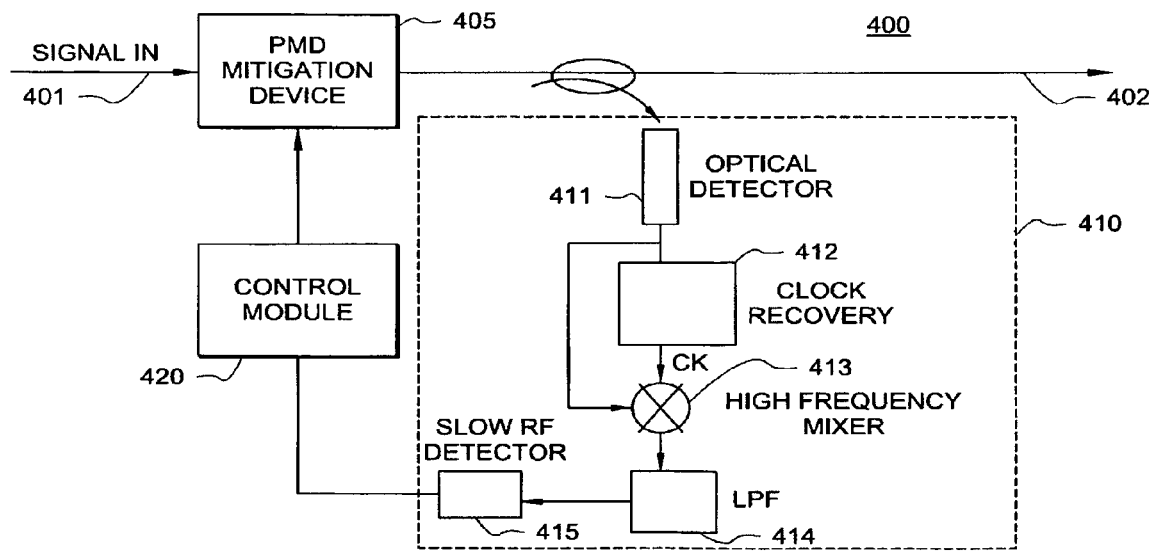
FIG. 4 is a block diagram of a PMD mitigator having a measurement module based on a clock recovery system, according to one exemplary embodiment of the present invention.

FIG. 4 shows PMD mitigator 400 having measurement module 410 based on a clock recovery system according to one exemplary embodiment of the present invention. PMD mitigator 400 may also be used to implement one of the PMD measurement and/or calibration methods described above. In operation, optical input signal 401 passes through PMD mitigation device 405, which produces optical output signal 402. Optical detector 411 of PMD measurement module 410 is optically coupled to the optical line, and it is operable to receive a portion of optical output signal 402, thus converting it into an electrical signal. Clock recovery unit 412 is electrically coupled to optical detector 411 or to the input electrical signal and it is operable to extract a clock signal from the electrical signal. Combiner 413 is electrically coupled to clock recovery unit 412 and to optical detector 411, and it is operable to mix the clock signal with the electrical signal. Lowpass filter 414 is electrically coupled to combiner 413 and it is operable to receive the combiner's output signal and produce a filtered electrical signal. In practice, however, because the clock frequency in most 40 Gb/s circuits is 20 GHz rather than 40 GHz, an alternative embodiment may comprise a first combiner, low-pass filter, and detector for carrying information about $f_c$ (e.g., 20 GHz), and a second combiner, low-pass filter, and detector for carrying information about $2f_c$ (e.g., 40 GHz). Radio-frequency (RF) detector 415 is electrically coupled to lowpass filter 414 and it is operable to measure an intensity of the filtered electrical signal. In one exemplary embodiment, combiner 413 is a high frequency combiner, lowpass filter 414 has a relatively low cutoff frequency (as low as 10 kHz), and RF detector 415 is a slow detector.

Control module 420 is electrically coupled to RF detector 415, and PMD mitigation device 405 is electrically coupled to control module 420. Finally, control module 420 is operable to process an intensity measurement received from RF detector 415 and to control at least one optical component within PMD mitigation device 405 using methods 100 and/or 200 of FIGS. 1 and 2 in order to correct or reduce PMD in the optical line.

Some of the exemplary embodiments described above provide novel and inventive systems and methods for measuring PMD. However, as a person of ordinary skill in the art will readily recognize in light of this disclosure, any type of PMD or DGD measuring device or method, other than explicitly disclosed herein, may be used along with the PMD mitigation systems and methods depicted below.

Figure 5:
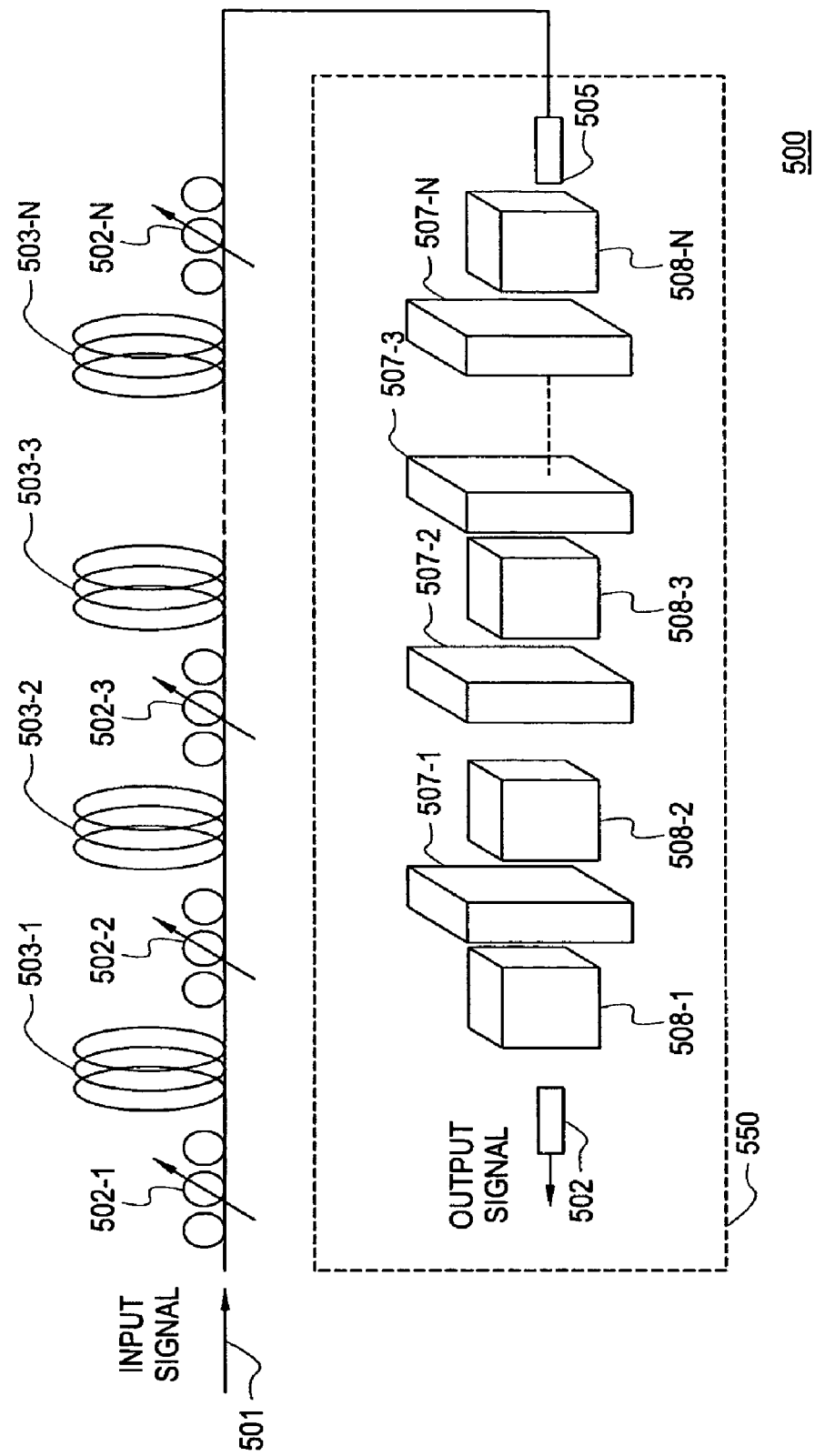
FIG. 5 is a diagram of a PMD mitigation device model, according to one exemplary embodiment of the present invention.

Turning now to FIG. 5, PMD mitigation device model 500 is depicted according to one exemplary embodiment of the present invention. Under model 500, input optical signal 501 is transmitted via an optical line having a series of birefringence fibers 503-1-N, where between two successive fibers ones there is a polarization manipulating element 502-1-N. Input optical signal 501 reaches PMD mitigation device 550, where the effects of each of components 502-1-N and 503-1-N is eliminated by each components 508-1-N and 507-1-N—i.e., 508-1 cancels 502-N, 507-1 cancels 503-N, and so on. Specifically, input optical signal 501 enters PMD mitigation device 550 via first collimator 505 and is processed by birefringence elements 508-1-N and 507-1-N, which one by one eliminate the effects of optical line elements 502-1-N and 503-1-N. PMD mitigation device 550 then provides output optical signal 502 via second collimator 502.

Figure 6:
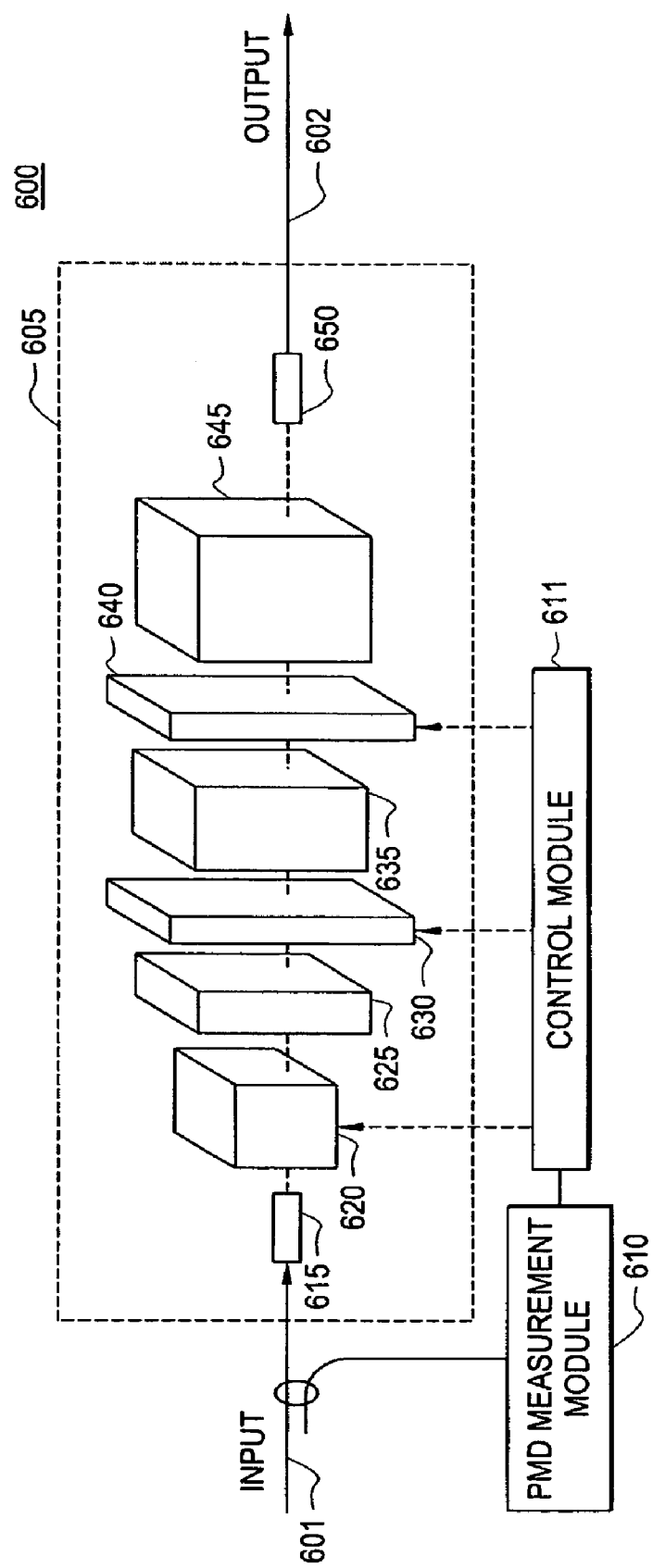
FIG. 6 is a block diagram of a single-stage, free-space PMD mitigation system, according to one exemplary embodiment of the present invention.

FIG. 6 shows single-stage, free space PMD mitigation system 600, according to one exemplary embodiment of the present invention. PMD mitigation device 605 of system 600 may be used, for example, to implement PMD mitigation device(s) 305 and/or 405 of FIGS. 3 and 4 according to model 500 depicted in FIG. 5. In one embodiment, mitigation device 605 comprises a plurality of free-space optical elements arranged in a cascaded configuration. In operation, optical input signal 601 reaches both PMD mitigation device 605 and PMD measurement module 610. PMD measurement module 610 processes optical input signal 601 and transmits an electrical signal to control module 611 that is indicative of the PMD of the optical line. Control module 611 then operates upon PMD mitigation device 605 to reduce or eliminate PMD in the optical line.

Optical input signal 601 reaches first collimator 611 and passes through polarization controller 620. Polarization controller 620 is operable to compensate for polarization changes that appear at the end of the optical line. In one embodiment, polarization controller 620 outputs a signal that travels through first birefringent crystal 625, first tunable λ/2 plate 630, second birefringent crystal 635, second tunable λ/2 plate 640, third birefringent crystal 645, and second collimator 650 (all of which are optically coupled to each other in a cascade fashion) thus producing PMD mitigated signal 602. As a person of ordinary skill in the art will readily recognize in light of this disclosure, an arbitrary number of crystals may be used. In some embodiments, crystals 625, 635, and 645 may have very large birefringence in order to compensate for the optical line's birefringence. In other embodiments where the polarization properties of the system cannot be described by such a "single step" presentation, PMD mitigation device 605 may be constructed as a multiple-stage device—i.e., Crystal—Polarization Controller—Crystal—Polarization Controller, etc. However, if there are no "twists" or other defects in the fiber, it may be possible to compensate the fiber's birefringence with a single stage systems such as PMD mitigation system 600.

Still referring to FIG. 6, PMD mitigation system 600 is a tunable device. In addition, system 600 advantageously operates between the two principal states of polarizations of the line, thus providing a relative, tunable optical delay line. Polarization controller 620 is provided in front crystals 625, 635, and 645, so that the principal states of polarization are oriented along the axes of crystals 625, 635, and 645. Crystals 625, 635, and 645 then fix the DGD between the two principal states of polarization of the line.

In one exemplary embodiment, crystals 625, 635, and 645 may be, for example, Calcite and/or Yttrium Vanadate (YVO4), for which the difference between the ordinary and extraordinary refraction indices is about 10%, i.e., $|n_o - n_e| \approx 0.2$. With these types of crystals, the PMD generated by as much as 500 km of an ordinary telecommunication fiber may be compensated with only about 5 cm of crystal. PMD mitigation device 605 may be made even more compact by replacing polarization controller 620 with a small free-space polarization controller, thus leaving collimators 611 and 650 responsible for coupling the input and output fibers.

Because the exact birefringence of any given optical line is generally unknown (in 40 Gb/s networks it can be as large as 25 ps), PMD mitigation device 605 may be made tunable—i.e., its length may be changed digitally. In the embodiment shown in FIG. 6, birefringence mitigation is performed by three crystals 625, 635, and 645. In other embodiments, the number of crystals may be changed depending on the desired precision. Each of crystals 625, 635, and 645 may have a different length, and their contributions to the overall mitigation may depend on the polarization of incident light 601. Therefore, between two successive crystals, tunable half-wave phase retardation ($\lambda/2$) plates 630 and 640 may be added, thus effectively controlling the sign of the specific crystal's contribution. That is, each of tunable $\lambda/2$ plates 630 and 640 may operate in one of two modes: (1) as a 90° polarization rotator, or (2) as a transparent film—i.e., a full wavelength ($\lambda$) plate, keeping the polarization intact. As such, each of plates 630 and 640 dictates if the PMD of the crystal that follows it will be added to the overall device PMD or will be subtracted from it.

If, for example, the time delay between the two polarization orientations of the crystals are 4 ps, 8 ps and 16 ps respectively (in the case of YVO4, these delays correspond to crystal lengths of 6 mm, 12 mm and 24 mm, respectively), the DGD may be reduced as long as it falls between −28 ps to +28 ps with a resolution of 8 ps. In this example, the worst time-delay of the entire system (with PMD mitigation device 605) is $|\Delta t| \leq 4$ ps. Thus, use of an additional 2 ps crystal may improve the resolution by 4 ps—i.e, $|\Delta t| \leq 2$ ps. Another option is to choose crystals lengths of about 6 mm, 12 mm and 18 mm, in which case PMD correction of only ±24 ps is achieved. However, this example allows the system to work in a zero PMD scenario. In one alternative embodiment, PMD mitigation device 605 may operate in reflection mode, so that a signal may pass one or more of crystals 625, 635, and 645 more than once, and thus the required crystal dimensions may be reduced.

One of the advantages of PMD mitigation device 605 over the prior art is that it uses birefringence crystals 625, 635, and 645 rather than optical fibers and/or or a combination of polarization beam splitter with delay lines, thus greatly simplifying its design. Another advantage of PMD mitigator 605 over the prior art is that it provides and discrete, binary tuning set via tunable plates 630 and 640, as opposed to continuous tuning which is more complex and subject to errors. The two properties make it a relatively small device. As will be readily recognized by a person of ordinary skill in the art, PMD mitigator 605 may be integrated within an optical transponder, thus resulting in a high performance, low cost, and compact device. Moreover, when used within an integrated optical transponder, PMD mitigator 605 may reduce first order PMD while a multi-level transmitter may mitigate higher order PMD as described in U.S. patent application Ser. No. 11/585,659, entitled "OPTICAL TRANSPONDERS WITH REDUCED SENSITIVITY TO POLARIZATION MODE DISPERSION (PMD) AND CHROMATIC DISPERSION (CD)."

FIG. 7 depicts graph 700 of simulated results for a single-stage PMD mitigation system such as the one depicted in FIG. 6, according to one exemplary embodiment of the present invention. Horizontal axis 705 represents time in units of ps, whereas vertical axis 710 represents power in units of μW. Upper curves 701 show the output signal of a network with a PMD of about 30 ps. Specifically, signals 701-1 and 701-2 show two extreme cases of PMD for the two principal states of polarization. Lower curves 702 show the output signal of the PMD mitigation device 605 for the same two principal polarization states, thus demonstrating that PMD mitigation device 605 severely reduces the system's PMD.

Figure 8:
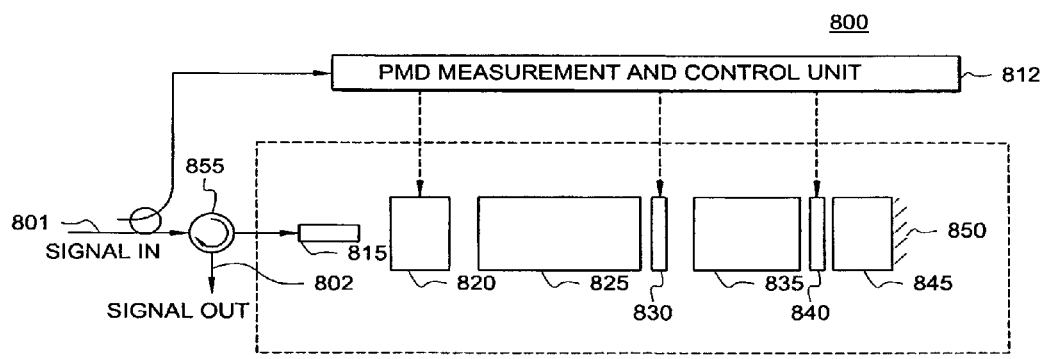
FIG. 8 is a block diagram of a PMD mitigator in a reflective configuration, according to yet another exemplary embodiment of the present invention.

FIG. 8 shows another PMD mitigator 800 in a reflective configuration, according to another exemplary embodiment of the present invention. This particular embodiment is preferred because it allows PMD mitigator 800 to be smaller than the PMD mitigator shown in FIG. 6. Particularly, this embodiment allows crystals 825, 835, and 845 to have half the size of their counterparts in FIG. 6. In this case, input optical signal 801 enters DGD mitigator 800 via fiber circulator 855, which may be placed anywhere in the transponder case. Mirror 850 may take the form of a highly reflecting coating on crystal 845. For example, in the case of Yttrium Vanadate ($YVO_4$) crystals, where DGD mitigator 800 is designed to mitigate 30±5 ps, the lengths of crystals 825, 835, and 845 may be 11.25 mm, 7.5 mm, and 3.75 mm, respectively, which means that the entire DGD mitigator 800 may be made smaller than 40 mm.

Figure 9:
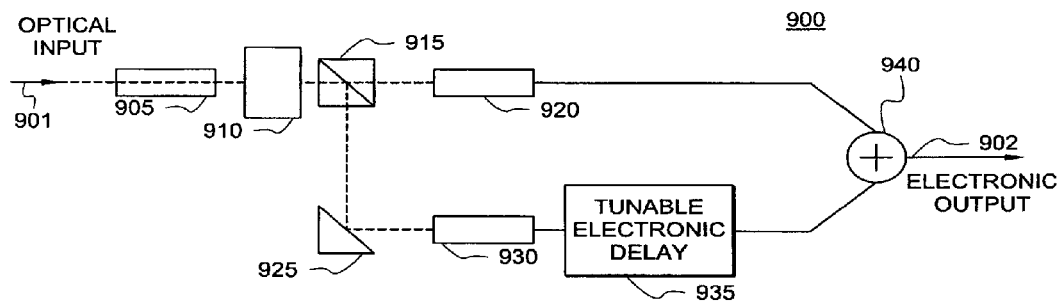
FIG. 9 is a block diagram of electro-optical hybrid PMD mitigation system, according to one exemplary embodiment of the present invention.

Turning now to FIG. 9, electro-optical hybrid PMD mitigation system 900 is depicted according to yet another exemplary embodiment of the present invention. Hybrid system 900 may be used, for example, as an alternative to the all-optical PMD mitigation devices 305, 405, 605, and/or 805 described in connection with FIGS. 3, 4, 6, and 8. Optical input signal 901 is transmitted through polarization beam splitter 915 after passing through collimator 905 and polarization controller 910. Polarization controller 910 may orient the two principal states of polarization of the uncorrected line and polarization controller 910, so that they match the polarization axes of polarization beam splitter 915.

Polarization beam splitter 915 then splits the optical signal into two portions, where the first portion (which has a first state of polarization) is converted into a first electrical signal by first optical detector 920, and the second portion (the faster portion, which requires delay and has a second state of polarization) is converted into a second electrical signal by second optical detector 930 after being reflected by element 925. The second electrical signal is transmitted through tunable electronic delay device 935 to correct the optical line's DGD, and then the first and second electrical signals are recombined by an analog sum device or combiner 940 to create fixed output signal 902. In one alternative embodiment, another tunable electronic delay device (not shown) processes first electrical signal before it reaches analog sum device 940. Further, a Mach-Zehnder (MZ) modulator (not shown) or the like may be used to modulate the output of a laser (not shown) as a function of fixed output signal 902, thus resulting in an optical signal free from PMD effects of the optical line.

Figure 10:
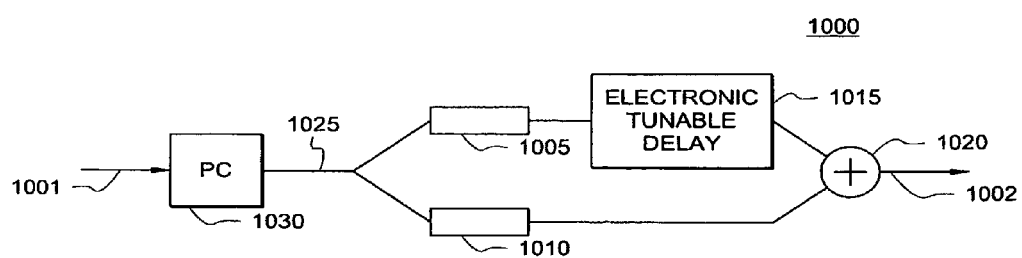
FIG. 10 is a block diagram of a PMD mitigator with a fiber polarization beam splitter, according to another exemplary embodiment of the present invention.

FIG. 10 is a block diagram of PMD mitigator 1000 with fiber polarization beam splitter 1025, according to another exemplary embodiment of the present invention. Polarization controller 1030 is fiber-coupled to fiber-polarization beam splitter 1025, which is directly coupled to detectors 1005 and 1010. The output of detector 1005 is transmitted through tunable electronic delay device 1015 to correct the optical line's DGD, and then the first electrical signals are recombined by analog sum device 1020 to create fixed output signal 1002. One advantage of this configuration is its relative simplicity and ease of assembly.

Although some exemplary embodiments of present invention and their advantages have been described above in detail, it should be understood that various changes, substitutions and alterations can be made herein without departing from the spirit and scope of the invention as defined by the appended claims. Moreover, the scope of the present invention is not intended to be limited to the particular embodiments of the process, machine, manufacture, means, methods and steps depicted herein. As a person of ordinary skill in the art will readily appreciate from this disclosure other, processes, machines, manufacture, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, means, methods, or steps.

We claim:

1. A method for correcting a polarization mode dispersion (PMD) of an optical line, the method comprising:
   splitting an optical signal traveling through the optical line into a first portion having a first principal state of polarization of the optical line and a second portion having a second principal state of polarization of the optical line;
   converting the first and second portions into a first and second electrical signals;
   delaying the second electrical signal to create a delayed electrical signal that compensates for a differential group delay (DGD) of the optical line; and
   mixing the delayed electrical signal with the first electrical signal to produce a fixed output electrical signal; and
   generating a control signal to control a light source to produce a PMD-compensated optical signal as a function of the fixed output electrical signal.

2. The method of claim 1, further comprising delaying the first electrical signal.

3. The method of claim 1, further comprising using the fixed output electrical signal to modulate the output of a laser.

4. The method of claim 1 further comprising:
   producing an output optical signal from the fixed output electrical signal, the output optical signal being substantially free from Polarization Mode Dispersion (PMD) effects.

5. An apparatus for correcting a polarization mode dispersion (PMD) of an optical line comprising:
   a splitter to split an optical signal traveling through the optical line into a first portion having a first principal state of polarization of the optical line and a second portion having a second principal state of polarization of the optical line;
   a signal processing device to convert the first and second portions into a first and second electrical signals;
   a delay device to delay the second electrical signal to create a delayed electrical signal that compensates for a differential group delay (DGD) of the optical line;
   a mixer to mix the delayed electrical signal with the first electrical signal to produce a fixed output electrical signal; and
   a control module to generate a control signal operable to control a light source to produce a PMD-compensated optical signal as a function of the fixed output electrical signal.

6. The apparatus of claim 5, further comprising a delay device configured to delay the first electrical signal.

7. The apparatus of claim 5, further comprising a control circuit configured to utilize the fixed output electrical signal to modulate the output of a laser.

8. The apparatus of claim 5, further comprising:
   a light source configured to produce an output optical signal from the fixed output electrical signal, the output optical signal being substantially free from Polarization Mode Dispersion (PMD) effects.

9. A method for correcting a polarization mode dispersion (PMD) of an optical line, the method comprising:
   splitting an optical signal traveling through the optical line into a first portion having a first principal state of polarization of the optical line and a second portion having a second principal state of polarization of the optical line;
   converting the first and second portions into a first and second electrical signals, respectively;
   delaying the first electrical signal;
   delaying the second electrical signal to create a delayed electrical signal that compensates for a differential group delay (DGD) of the optical line; and
   mixing the delayed electrical signal with the first electrical signal to produce a fixed output electrical signal.

10. The method of claim 9, further comprising using the fixed output electrical signal to modulate the output of a laser.

11. The method of claim 9 further comprising:
   producing an output optical signal from the fixed output electrical signal, the output optical signal being substantially free from Polarization Mode Dispersion (PMD) effects.

* * * * *